US006531009B1

(12) United States Patent
Prior

(10) Patent No.: US 6,531,009 B1
(45) Date of Patent: Mar. 11, 2003

(54) METHOD AND KIT FOR MAKING MARBLE PATTERNED GLASS ARTICLES

(76) Inventor: Nancy C. Prior, 1736 Stockton, Des Plaines, IL (US) 60018

( * ) Notice: Subject to any disclaimer, the term of this patent is extended or adjusted under 35 U.S.C. 154(b) by 0 days.

(21) Appl. No.: 09/510,776

(22) Filed: Feb. 23, 2000

(51) Int. Cl.[7] .................................................. B32B 31/00

(52) U.S. Cl. ............................ 156/63; 156/61; 156/293; 156/297; 156/314; 428/542.2; 428/542.6; 434/84

(58) Field of Search ............................ 156/61, 63, 295, 156/297, 299, 293, 314; 428/34.7, 34.4, 39, 38, 542.2, 542.6, 15; 434/84, 81

(56) References Cited

U.S. PATENT DOCUMENTS 258,808 A * 5/1882 Rhind
503,661 A * 8/1893 Gnuchtel
2,265,531 A * 12/1941 Laxer
4,105,734 A 8/1978 Nakagawa
4,126,719 A 11/1978 Koyanagi et al.
4,128,447 A 12/1978 Rork
4,179,760 A 12/1979 Nakagawa
4,209,486 A 6/1980 Ross
4,244,993 A 1/1981 Platka et al.
4,554,118 A 11/1985 Seifert
4,909,882 A * 3/1990 Sze ............................ 156/240
5,284,510 A 2/1994 Levy
5,518,535 A 5/1996 Boaz
5,677,064 A 10/1997 Boaz
6,022,437 A * 2/2000 White

* cited by examiner

*Primary Examiner*—Jeff H. Aftergut
(74) *Attorney, Agent, or Firm*—Charles F. Meroni, Jr.; Meroni & Meroni, P.C.

(57) ABSTRACT

An adhesive or glue, preferably regular white glue, is applied to a first surface of a transparent glass article. A water based paint is then applied sporadically to the glue so that the water based paint bleeds through the glue. A first side of a piece of tissue wrapping paper is then placed over the water based paint and glue to keep the water based paint and glue in place. The white glue and water based paint is then allowed to dry. A second side of the tissue wrapping paper is then painted with a metallic color.

19 Claims, 5 Drawing Sheets

(2 of 5 Drawing Sheet(s) Filed in Color)

METHOD AND KIT FOR MAKING MARBLE PATTERNED GLASS ARTICLES

BACKGROUND OF THE INVENTION

1. Field of the Invention

The present invention relates to a method and kit for making marble patterned articles.

2. Description of the Prior Art

Marble has long been a very popular decorative material for use in countertops, floors, tubs, statues and a variety of different items. The variations in color along with the interspersed flecks of white coloration give marble a distinct look which is quite appealing to some people. However, marble is quite expensive and cumbersome to work with. Marble is a hard material which requires great effort to carve and shape. As a result, there arose a need to create articles which simulated the look of marble, but which was easier and less expensive to work with than actual marble.

There are different methods of producing an artificial marble finish in the prior art. Simulated marble has been produced using marble mixes which are cast in molds and allowed to dry to form simulated marble items. While this method may work for larger structures, this process is not suitable for creating smaller decorative articles. Furthermore, it is difficult to control the ornate coloring embedded in the simulated marble. Simulated marble has also been produced by using paper with a marble colored pattern thereon and laminating over the paper. However, this method is also quite cumbersome to utilize when dealing with ornately shaped objects, and it produces a marble look which is less realistic.

Due to the difficulty of sculpting and polishing marble, only the most accomplished artisans can create ornate objects with marble. Furthermore, the coloring of the marble is limited to the natural color of the stone itself. There is no means by which additional coloring can be added to the marble in order to add to the artistic beauty of the stone.

Accordingly, there is a need for an inexpensive and easier method of creating marble patterned ornate objects.

Accordingly, there is also a need for a method of making marble patterned ornate objects having a variety of different colors and color combinations.

Accordingly, there is also a need for a means to allow artisans to create marble patterned ornate objects without having to use actual marble.

Lastly, there is also a need for realistic marble patterned ornate objects which are less expensive to produce then their marble counterparts.

The present invention is a method and kit for making marble patterned articles which have the look of authentic marble.

As will be described in greater detail hereinafter, the present invention solves the aforementioned and employs a number of novel features that render it highly advantageous over the prior art.

SUMMARY OF THE INVENTION

Accordingly, it is an object of this invention to provide an inexpensive and easier method of creating marble patterned ornate objects.

Accordingly, it is also an object of this invention to provide a method of making marble patterned ornate objects having a variety of different colors and color combinations.

Accordingly, it is also a further object of this invention to provide a means to allow artisans to create marble patterned ornate objects without having to use actual marble.

Lastly, it is also an object of this invention to provide marble patterned ornate objects which are less expensive to produce then their marble counterparts.

To achieve these objectives, and in accordance with the purposes of the present invention the following method and kit for making marble patterned articles are presented.

An adhesive or glue which binds to glass, preferably regular white glue, is applied to a first surface of a transparent glass article. A water based paint is then sporadically applied to the white glue so that the water based paint bleeds nonuniformly into the white glue. A plurality of different colored water based paints can be used simultaneously in order to add additional color to the marble pattern.

The white glue adheres the water based paint to the glass article and also dilutes the color of the water based paint. The water based paint is suspended in the white glue and the nonuniform bleeding of the water based paint in the white glue creates variations in color shading which imitate marble.

By looking through the glass article from a second surface, the marble pattern being created can be inspected. Once a desired marble pattern is achieved, a first side of a piece of tissue wrapping paper is then placed over the water based paint and glue to keep the water based paint and glue in place. The tissue wrapping paper can also be manipulated to further bleed the water based paint into the white glue. The manipulation of the tissue wrapping paper causes smearing of the water based paint and the white glue altering the marble pattern.

The process of applying white glue and water based paint to the glass article and covering with tissue wrapping paper is continued until the entire interior surface of the glass article is covered. Additional coloring can then be added by applying water based paint through the second side of the tissue wrapping paper. Once the desired marble pattern is achieved, the white glue is allowed to harden, affixing the paint and the tissue onto the glass article.

Once the glue has hardened, the second side of the tissue wrapping paper is painted. In order to make the glass article completely opaque when viewed through the second surface, a metallic colored paint is used to paint the second side of the tissue wrapping paper. The metallic paint is then allowed to dry, and then a varnish is applied to seal the interior surface of the glass article.

The method above produces an attractive marble like appearance. Since the glass articles utilized will have an ornate shape prior to the process of creating the marble appearance, there would be no need to perform the sculpting and polishing typically required for most marble articles. Furthermore, the method above allow a variety of different colors and color combination, some typically not found in natural marble, to be used. Consequently, new and distinct marble-like creations can be easily made.

As part of my invention, a prepackaged kit is made so that people can create their own marble patterned glass articles. The kit shall contain a container of glue, a container of water based paint, a plurality of sheets of tissue wrapping paper, metallic paint, varnish, and an instruction manual providing my method for creating marble patterned decorative glass articles.

Other objects, features, and advantages of the invention will become more readily apparent upon reference to the following description when taken in conjunction with the accompanying drawings.

BRIEF DESCRIPTION OF THE DRAWINGS

The file of this patent contains at least one drawing executed in color. Copies of this patent with color drawing (s) will be provided by the Patent and Trademark Office upon request and payment of necessary fee.

DESCRIPTION OF THE PREFERRED EMBODIMENT

The present invention is a method and kit for making marble patterned glass articles which have the look of authentic marble.

Referring to FIGS. 1, 2, 3, and 4, a transparent glass article having a first and second surface, and preferably ornately shaped, is used to create the marble patterned glass article. Translucent glass articles may also be used, but the marble pattern is less pronounced on translucent glass articles. An adhesive or glue which binds to glass and which becomes partially opaque when it dries, preferably regular white glue 12, is applied to a first surface 11 of the transparent glass article 10. The white glue 12 adheres the water based paint to the glass article and also dilutes the color of the water based paint.

A water based paint, preferably acrylic paint 13, is then sporadically applied to the white glue 12, so that the water based paint bleeds nonuniformly into the white glue. The bleeding effect can be increased by swirling the acrylic paint 13 into the white glue 12 so that the two intermix. In an alternative method, the white glue 12 and the water based paint 13 are mixed together and then applied to the first surface 11 of the glass article 10 concurrently.

The white glue and the acrylic paint is not thoroughly intermixed. A more pronounced marble effect appears when there is a nonuniform distribution of acrylic paint in the glue. When the white glue 12 hardens, the acrylic paint 13 will be suspended in the white glue and the nonuniform mixture of the acrylic paint and the white glue creates variations in color shading which adds to the marble effect. A plurality of different colored acrylic paints can also be used simultaneously in order to add additional color to the marble pattern.

Figure 1:
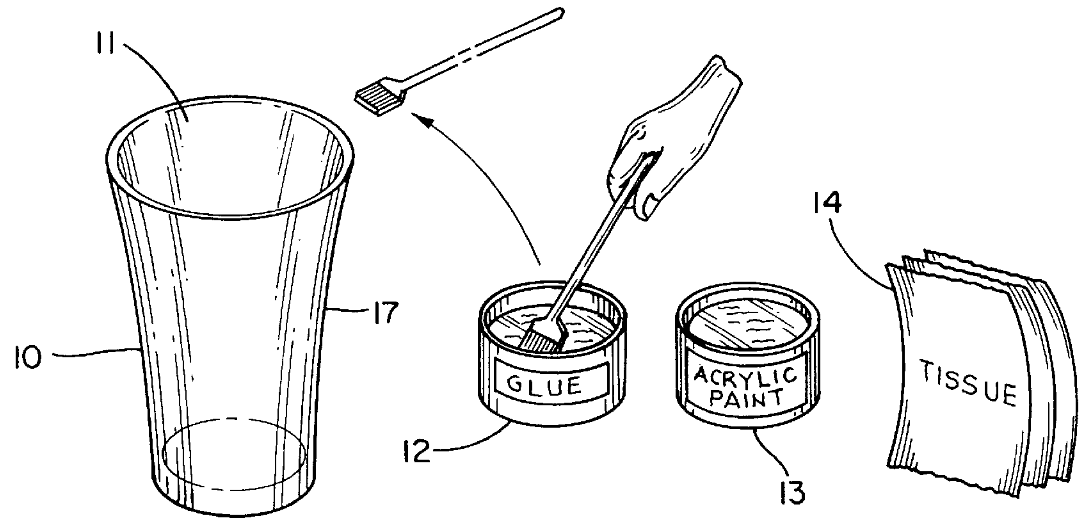
FIG. 1 is a perspective view of the items required to begin the process of utilizing my method.
Figure 2:
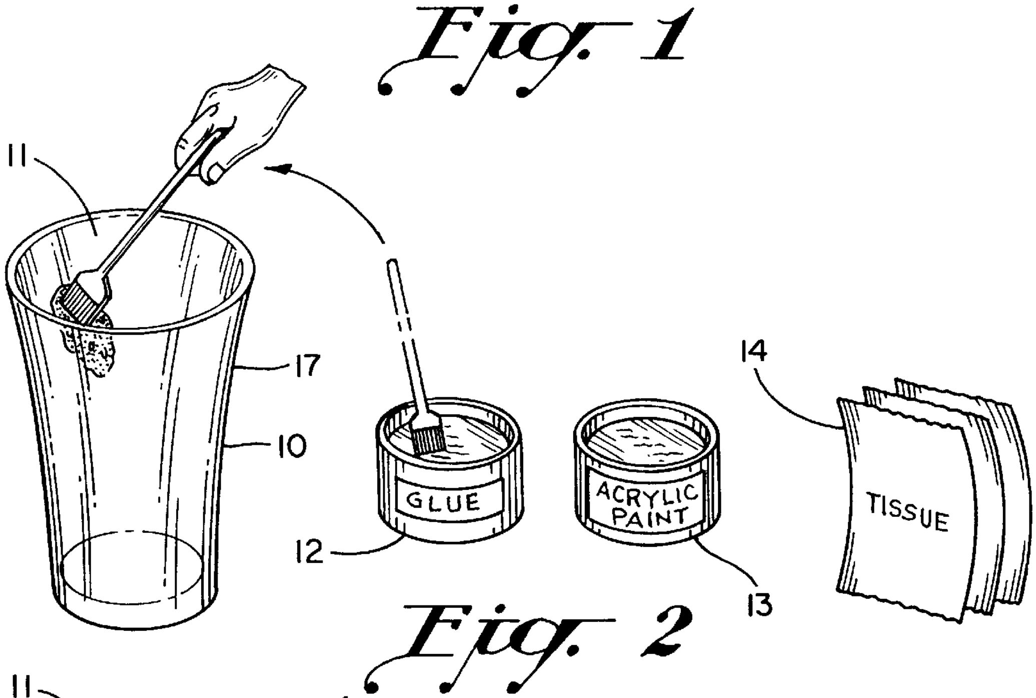
FIG. 2 is a perspective view of the step of applying of white glue on a first surface of a glass article.
Figure 3:
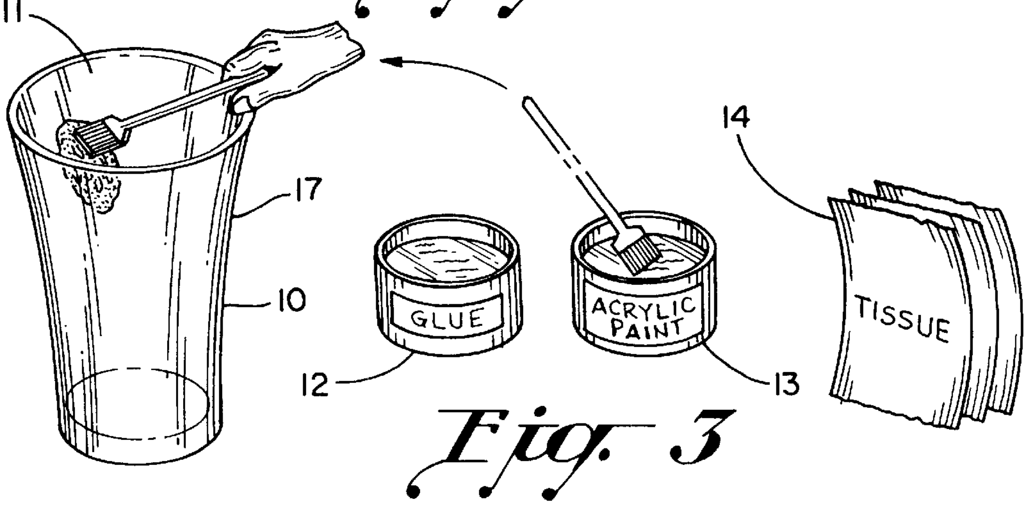
FIG. 3 is a perspective view of the step of applying acrylic paint on the white glue.
Figure 4:
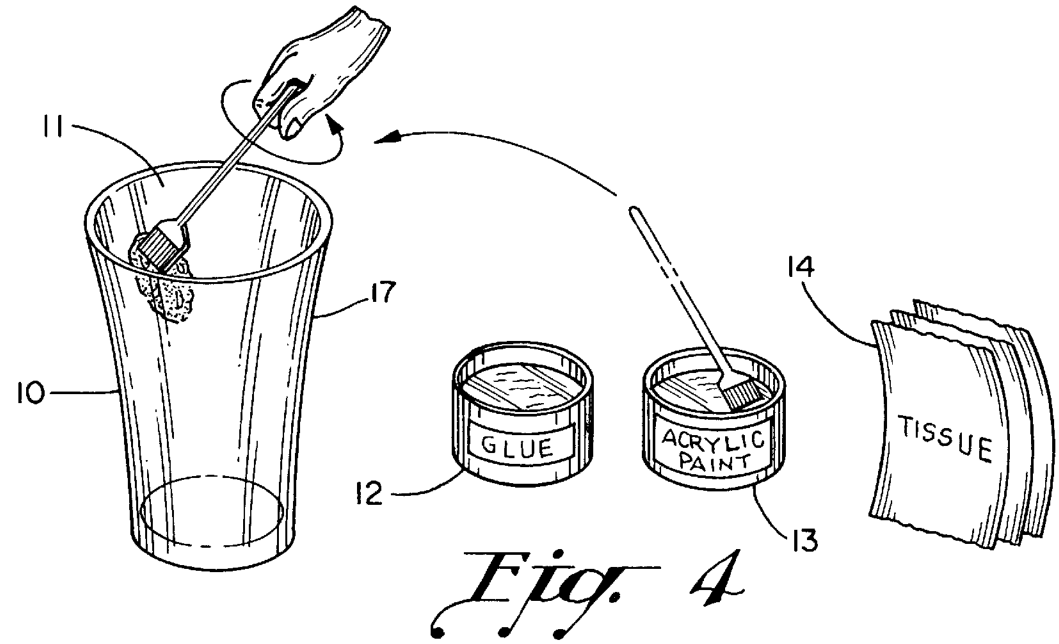
FIG. 4 is a perspective view of the step of swirling of the acrylic paint and the white glue in order to mix the items together.
Figure 5:
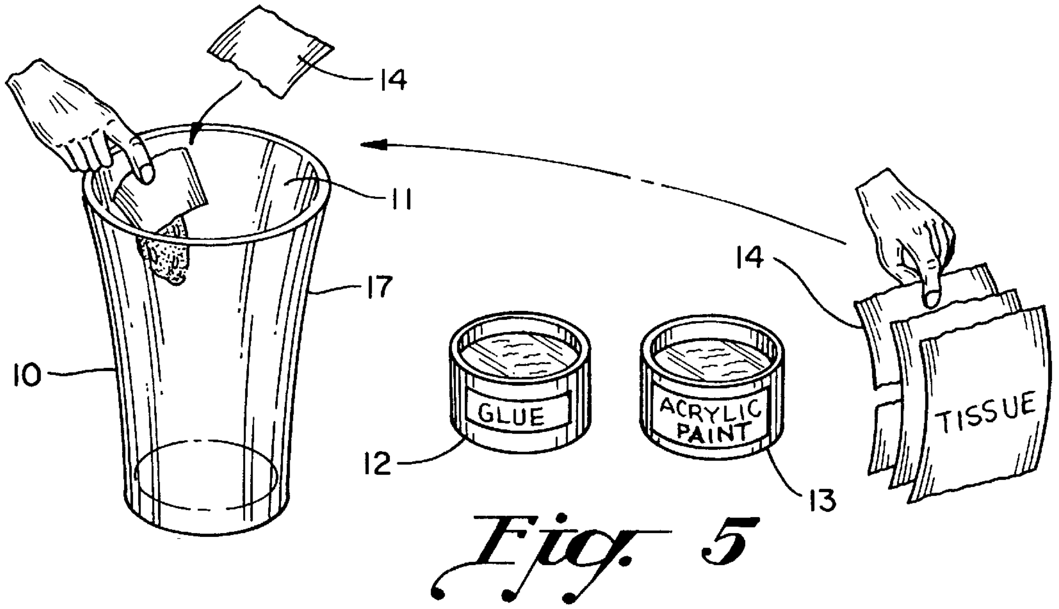
FIG. 5 is a perspective view of the step of applying tissue wrapping paper over the white glue and acrylic paint and manipulating the tissue wrapping paper.

Referring to FIG. 5, by looking through the glass article 10 from the second surface 17 of the glass article 10, one can see the marble pattern emerging. When a desired pattern is achieved, a water permeable tissue wrapping paper 14 is then used to cover the white glue 12 and the acrylic paint 13. The first side of a piece of tissue wrapping paper 14 is positioned over and then placed onto the acrylic paint 13 and the white glue 12 keeping the acrylic paint 13 and white glue 12 in place. The tissue wrapping 14 paper can also be manipulated to further bleed the acrylic paint 13 into the white glue 12. The manipulation of the tissue wrapping paper 14 causes smearing of the acrylic paint and the white glue 12 altering the marble pattern.

The process of applying white glue 12 and acrylic paint 13 and covering the two with tissue wrapping paper is continued until the entire interior surface 11 of the glass article 10 is covered. Additional coloring can also be added at this point by applying water based paint through the second side of the tissue wrapping paper. Once the desired marble pattern is achieved, the white glue 12 is allowed to harden, affixing the paint and the tissue wrapping paper 14 onto the glass article.

Figure 6:
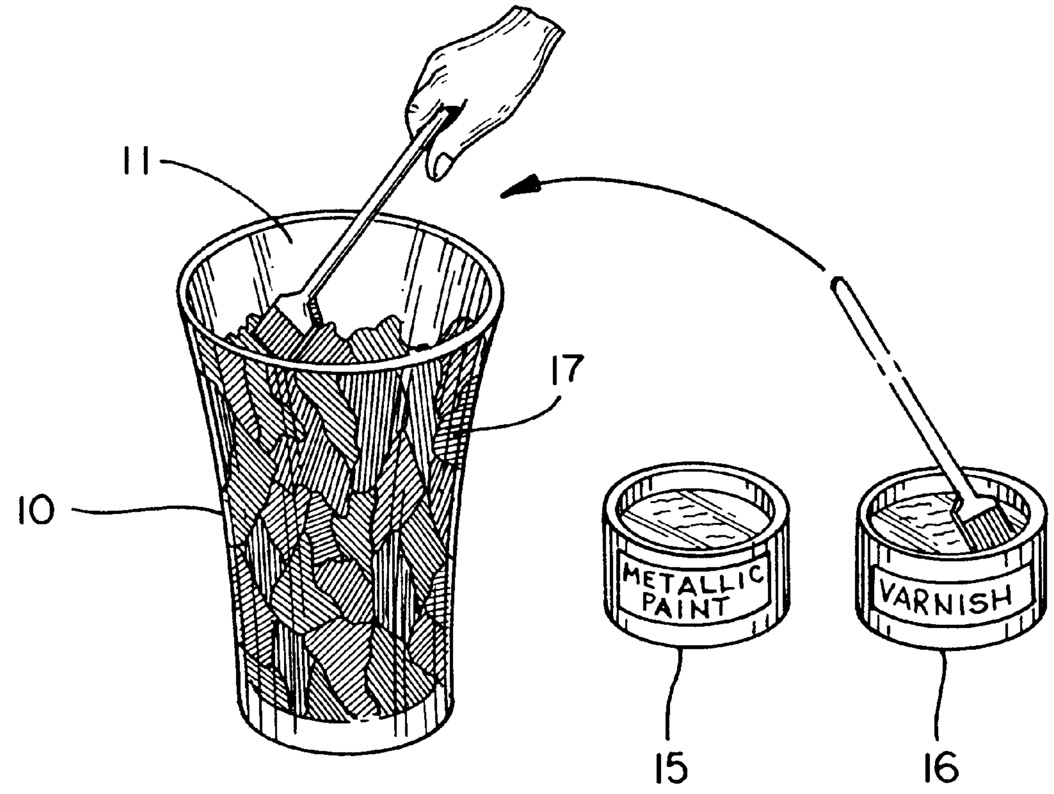
FIG. 6 is a perspective view of the step of applying varnish to the interior surface of the glass article.

Referring to FIG. 6, once the white glue 12 has hardened the second side of the tissue wrapping paper 14 is painted. In order to make the glass article completely opaque when viewed through the second surface, a metallic colored paint 15 is used to paint the second side of the tissue wrapping paper 14. The metallic paint 15 is then allowed to dry. A varnish 16 or other form of sealant which is compatible with water based paint is then applied to seal the interior surface of the glass article 10.

Figure 7:
FIG. 7 is a vase decorated with the marbling effect.
Figure 8:
FIG. 8 is a piece of glass decorated according to the process.

The methods above produce a glass article, which when viewed through the second surface 17 of the glass article 10, produce an attractive marble like appearance. Since the glass articles utilized will have an ornate shape prior to the process of creating the marble appearance, there would be no need to perform the sculpting and polishing typically required for most marble articles. FIG. 7 depicts a vase provided with the marbling appearance made according to the above described process. Furthermore, the methods above allow a variety of different colors and color combination, some typically not found in natural marble, to be used. Consequently, new and distinct marble-like creations can be easily made. FIG. 8 is another example of the marble effects achieved when practicing the process.

In yet another alternative method, the above processes repeated to create a marble patterned sheet. Instead of using a glass article, a flat transparent plastic sheet is used. Also, an adhesive or glue which does not bond to the transparent plastic sheet, preferably regular white glue 12, is used. Using the method above, a marble patterned sheet is created which is peeled off the flat transparent plastic sheet. The marble patterned sheet can be cut and shaped to create marble patterned articles.

In an alternative embodiment of my invention, a prepackaged kit is made containing an instruction manual and all the necessary materials for creating marble patterned glass articles. The kit shall contain a container of glue, a container of water based paint; a plurality of sheets of tissue wrapping paper, metallic paint, varnish, and an instruction manual providing my method for creating marble patterned decorative glass articles.

The methods above produce a glass article, which when viewed through the second surface 17 of the glass article 10, produce an attractive marble like appearance. Since the glass articles utilized will have an ornate shape prior to the process of creating the marble appearance, there would be no need to perform the sculpting and polishing typically required for most marble articles. Furthermore, the methods above allow a variety of different colors and color combination, some typically not found in natural marble, to be used. Consequently, new and distinct marble-like creations can easily be created.

The invention described above is the preferred embodiment of the present invention. It is not intended that the novel device be limited thereby. The preferred embodiment may be susceptible to modifications and variations that are within the scope and fair meaning of the accompanying claims and drawings.

I claim:

1. A method for making marble patterned glass articles from transparent glass articles, the method comprising:

applying glue to an inside surface of a transparent glass article;

applying water based paint sporadically to the glue, intermixing the glue and the water based paint;

applying a first side of tissue wrapping paper over the glue and the paint, keeping the glue and water based paint in place; and allowing the glue to harden.

2. The method for making marble patterned glass articles in claim 1, further comprising the additional step of painting a second side of the tissue wrapping paper a metallic color once the glue hardens.

3. The method for making marble patterned glass articles in claim 2 further comprising the additional step of applying varnish to the second side of the tissue wrapping paper to seal the interior surface of the glass article.

4. The method for making marble patterned glass articles in claim 1, further comprising the additional step of adding water based paint through the second side of the tissue wrapping paper before the glue hardens.

5. The method for making marble patterned glass articles in claim 1 wherein a plurality of different colored water based paints are applied to the glue.

6. The method for making marble patterned glass articles in claim 1 further comprising the additional step of swirling the water based paint into the glue prior to applying the tissue wrapping paper.

7. The method for making marble patterned glass articles in claim 1 further comprising manipulating the tissue wrapping paper so that the water based paint and glue smear.

8. A method for making marble patterned glass articles from transparent glass articles, the method comprising:

mixing white glue and water based paint;

applying the mixture of white glue and water based paint to a first surface of a glass article;

applying a first side of tissue wrapping paper over the glue and the paint, keeping the glue and water based paint in place; and allowing the white glue to harden.

9. The method for making marble patterned glass articles in claim 8, further comprising the additional step of painting a second side of the tissue wrapping paper a metallic color once the glue hardens.

10. The method for making marble patterned glass articles in claim 9 further comprising the additional step of applying a varnish to the second side of the tissue wrapping paper.

11. The method for making marble patterned glass articles in claim 8, further comprising the additional step of adding water based paint through the second side of the tissue wrapping paper before the glue hardens.

12. The method for making marble patterned glass articles in claim 8 wherein a plurality of different colored water based paints are mixed to the glue.

13. A method for making marble patterned glass articles from transparent glass articles, the method comprising:

applying glue to an inside surface of a transparent glass article;

applying water-based paint sporadically to the glue, intermixing the glue and the water based paint;

randomly applying first sides of a plurality of pieces of tissue wrapping paper over the glue and the paint, the pieces of tissue wrapping paper having collective one-sided surface area approximating the inside surface area of the glass article, the pieces of tissue wrapping paper keeping the glue and water-based paint in place until the entire inside surface area of the glass article is covered;

adding water-based paint to the second sides of the randomly-applied pieces of tissue wrapping paper;

allowing the glue to harden;

painting the second sides of the randomly-applied pieces of tissue wrapping paper a metallic color; and applying varnish to the second side of the tissue wrapping paper to seal the interior surface of the glass article.

14. The method for making marble patterned glass articles in claim 13 wherein a plurality of different colored water-based paints are applied to the glue.

15. The method for making marble patterned glass articles in claim 14 wherein the step of sporadically applying water-based paint to the glue further comprises the additional step of swirling water-based paint into the glue prior to applying the pieces of tissue wrapping paper.

16. The method for making marble patterned glass articles in claim 15 wherein the step of randomly applying first sides of a plurality of pieces of tissue wrapping paper over the glue and the paint further comprises manipulating the pieces of tissue wrapping paper so that the water-based paint and the glue smear.

17. A method for making marble patterned glass articles from transparent glass articles, the method comprising:

mixing white glue and water-based paint;

applying the mixture of white glue and water-based paint to a first surface of a glass article;

randomly applying first sides of a plurality of pieces of tissue wrapping paper over the glue and the paint, the pieces of tissue wrapping paper having collective one-sided surface area approximating the inside surface area of the glass article, the pieces of tissue wrapping paper keeping the glue and water-based paint in place until the entire inside surface area of the glass article is covered;

allowing the white glue to harden;

painting the second sides of the randomly-applied pieces of tissue wrapping paper a metallic color; and applying a varnish to the second sides of the randomly-applied pieces of tissue wrapping paper.

18. The method for making marble patterned glass articles in claim 17 further comprising the additional step of adding water-based paint to the second sides of the randomly-applied pieces of tissue wrapping paper before allowing the white glue to harden.

19. The method for making marble patterned glass articles in claim 18 wherein the step of mixing white glue and water-based paint further comprises mixing a plurality of different colored water-based paints with the white glue.

* * * * *